(12) United States Patent
Faytlin (10) Patent No.: US 7,150,112 B2
(45) Date of Patent: Dec. 19, 2006

(54) BLOWER CONTROL SYSTEM (75) Inventor: Natalya Faytlin, Walled Lake, MI (US)

(73) Assignee: Proto-Vest, Inc., Glendale, AZ (US)

( * ) Notice: Subject to any disclaimer, the term of this patent is extended or adjusted under 35 U.S.C. 154(b) by 76 days.

(21) Appl. No.: 10/711,315

(22) Filed: Sep. 10, 2004

(65) Prior Publication Data

US 2005/0086835 A1 Apr. 28, 2005

Related U.S. Application Data (63) Continuation-in-part of application No. 10/216,152, filed on Aug. 9, 2002, now abandoned.

(51) Int. Cl.
F26B 19/00 (2006.01)

(52) U.S. Cl. ........................ 34/666; 15/312.1

(58) Field of Classification Search ............... 34/666, 34/201, 202, 541, 525, 565; 15/312.1, 316.1, 15/405
See application file for complete search history.

(56) References Cited

U.S. PATENT DOCUMENTS

| 2,440,157 | A |   | 4/1948  | Rousseau            |
|-----------|---|---|---------|---------------------|
| 3,279,093 | A |   | 10/1966 | Dutton              |
| 3,765,104 | A |   | 10/1973 | Takeuchi            |
| 4,589,160 | A | * | 5/1986  | Day et al. ... 15/316.1 |
| 4,730,401 | A |   | 3/1988  | Machin              |
| 4,995,136 | A | * | 2/1991  | Smith ......... 15/312.1 |
| 5,090,429 | A |   | 2/1992  | Barber              |
| 5,189,754 | A | * | 3/1993  | Sauter .......... 15/316.1 |
| 5,280,665 | A |   | 1/1994  | McElroy et al.      |
| 5,367,739 | A |   | 11/1994 | Johnson             |
| 5,421,102 | A |   | 6/1995  | McElroy et al.      |
| 5,596,818 | A |   | 1/1997  | Jones               |
| 5,749,161 | A |   | 5/1998  | Jones               |
| 5,901,461 | A |   | 5/1999  | McElroy et al.      |
| 5,960,564 | A |   | 10/1999 | McElroy et al.      |
| 6,000,095 | A |   | 12/1999 | Johnson             |
| 6,519,872 | B1|   | 2/2003  | McElroy et al.      |

* cited by examiner

Primary Examiner—Stephen Gravini
(74) Attorney, Agent, or Firm—Howard & Howard

(57) ABSTRACT

An actuator (42) moves a nozzle (16) between vertical operating positions to accommodate the changing longitudinal configuration of a vehicle (18) and a rotary drive (46) rotates the nozzle (16) about a nozzle axis to efficiently direct air against the contour of the vehicle (18). A first sensor (50) is disposed upstream of the nozzle (16) for detecting the presence of a vehicle from above and for generating a blower start signal (50) and for generating an actuator signal to energize the actuator (42) and move the nozzle system (14) vertically between the operating positions. A second sensor (52) is disposed between the first sensor (50) and the nozzle (16) for detecting the contour of a vehicle from above. A third sensor (56) is disposed downstream of the second sensor for sensing the rear of a vehicle from above. A controller (54) is responsive to the sensors for processing a rotary signal to energize the rotary drive (46) for rotating the nozzle (16) about a nozzle axis and for processing the blower start signal and the actuator signal. A processor (70) adjusts the blower operational time in response to the number of vehicles per predetermined time period to optimize the number of blower starts per hour.

17 Claims, 6 Drawing Sheets

BLOWER CONTROL SYSTEM

RELATED APPLICATION

This application is a continuation-in-part of application Ser. No. 10/216,152 filed Aug. 9, 2002, now abandoned.

BACKGROUND OF THE INVENTION

1. Field of the Invention

The subject invention relates to an assembly for blowing liquids from the surface of a vehicle in a car wash.

2. Description of the Prior Art

Assemblies for blowing liquids from a vehicle typically include a support plenum for distributing air and a nozzle system including a nozzle for directing air toward the top of a vehicle. Examples of such assemblies are disclosed in U.S. Pat. Nos. 5,421,102; 5,901,461 and 5,960,564, all in the name of McElroy et al and assigned to the assignee of the subject invention.

Many assemblies include an air delivery conduit interconnecting the plenum and the nozzle system for delivering air from the plenum to the nozzle system while allowing the nozzle system to move in an adjustment direction toward and away from the plenum between various vertical-operating positions. Examples of such systems are disclosed in U.S. Pat. Nos. 2,440,157 to Rousseau and 3,765,104 to Takeuchi. Yet other assemblies rotate the nozzle to different directions as the vehicle moves therepast. Examples of such assemblies are disclosed in U.S. Pat. Nos. 3,279,093 to Dutton; U.S. Pat. No. 4,730,401 to Machin; U.S. Pat. Nos. 5,367,739 and 6,000,095 to Johnson; U.S. Pat. No. 5,596,818 to Jones; and U.S. Pat. No. 5,749,161 to Jones.

The earlier filed patent application referred to above, broadly discloses a control system for controlling the movement of the nozzle but there remains a need for a more multifaceted control system.

SUMMARY OF THE INVENTION AND ADVANTAGES

The subject invention fills this need and provides an assembly having both features.

The invention provides an assembly for blowing liquids from a vehicle comprising a support plenum for distributing air, a nozzle system including a nozzle for directing air toward the top of a vehicle, and an air delivery conduit interconnecting the plenum and the nozzle system for delivering air from the plenum to the nozzle system while allowing the nozzle system to move in an adjustment direction toward and away from the plenum between various vertical operating positions. A first sensor is disposed upstream of the nozzle for detecting the presence of a vehicle from above and for generating a blower start signal and for generating an actuator signal to energize the actuator and move the nozzle system vertically between the operating positions. A second sensor is disposed between the first sensor and the nozzle for detecting the contour of a vehicle from above. A third sensor is disposed downstream of the second sensor for sensing the rear of a vehicle from above. A controller is responsive to the sensors for processing a rotary signal to energize the rotary drive for rotating the nozzle about a nozzle axis and for processing the blower start signal and the actuator signal.

Accordingly, the assembly includes a nozzle system that may be moved up and down to accommodate the changing longitudinal configuration of a vehicle and the nozzle may be rotated about the nozzle axis to efficiently direct air against the contour of the vehicle with a plurality of sensors that sense the presence of a vehicle and a controller to control the various operations of the system as the vehicle moves beneath the nozzle.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE PREFERRED EMBODIMENT

Referring to the Figures, wherein like numerals indicate like or corresponding parts throughout the several views, an assembly for blowing liquids from a vehicle is generally shown at 10.

The assembly comprises a support plenum 12 for distributing air. A nozzle system is generally indicated at 14 and includes a nozzle 16 for directing air toward the top of a vehicle 18. The nozzle 16 comprises a flexible material, such as a fabric as is well known in the art. In addition, the assembly includes side nozzles systems, generally shown at 17 for directing air from the side legs of the plenum 12, as is well known and shown in the aforementioned U.S. Pat. No. 5,960,564.

Figure 1:
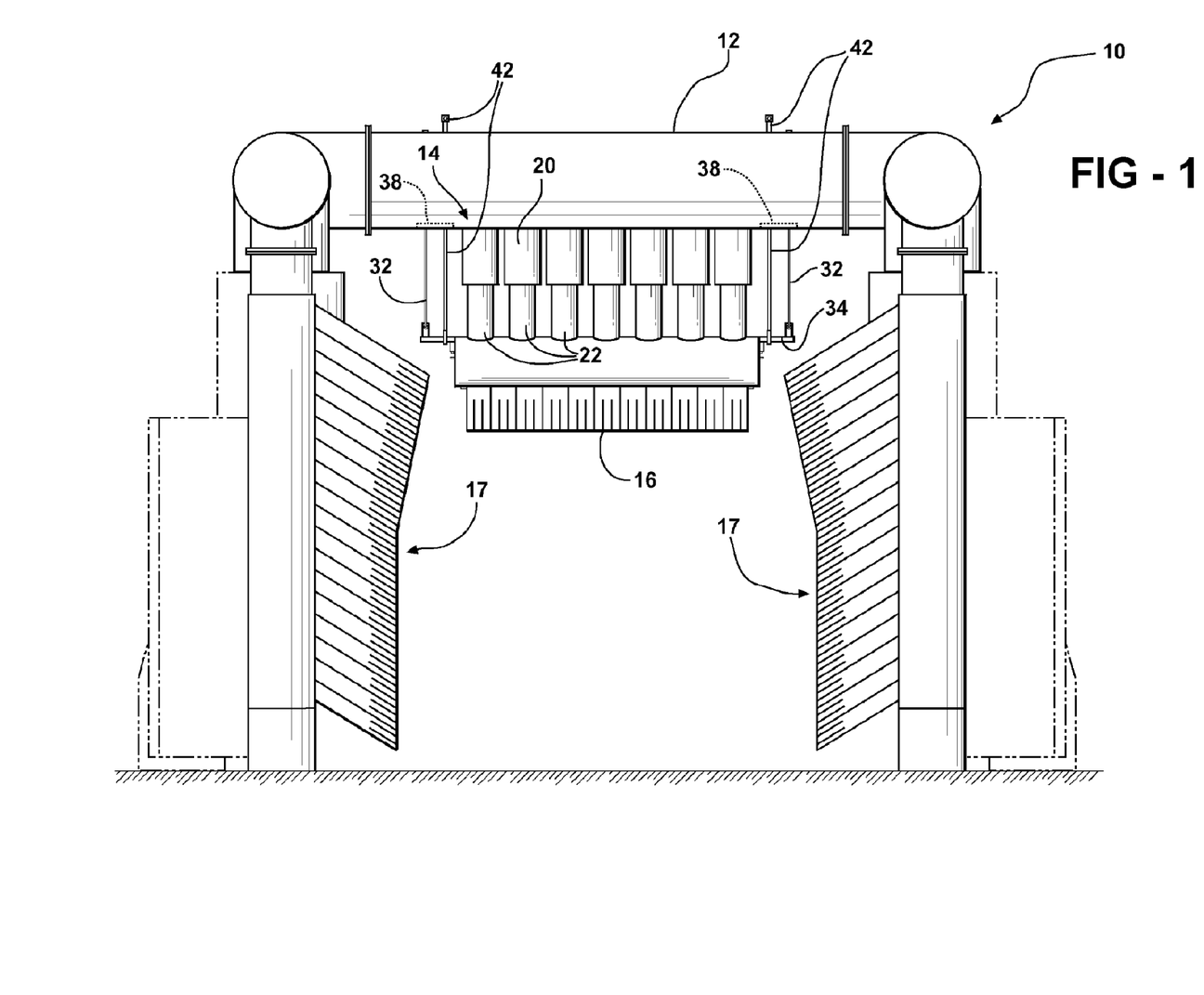
FIG. 1 is a frontal view of the subject invention.
Figure 2:
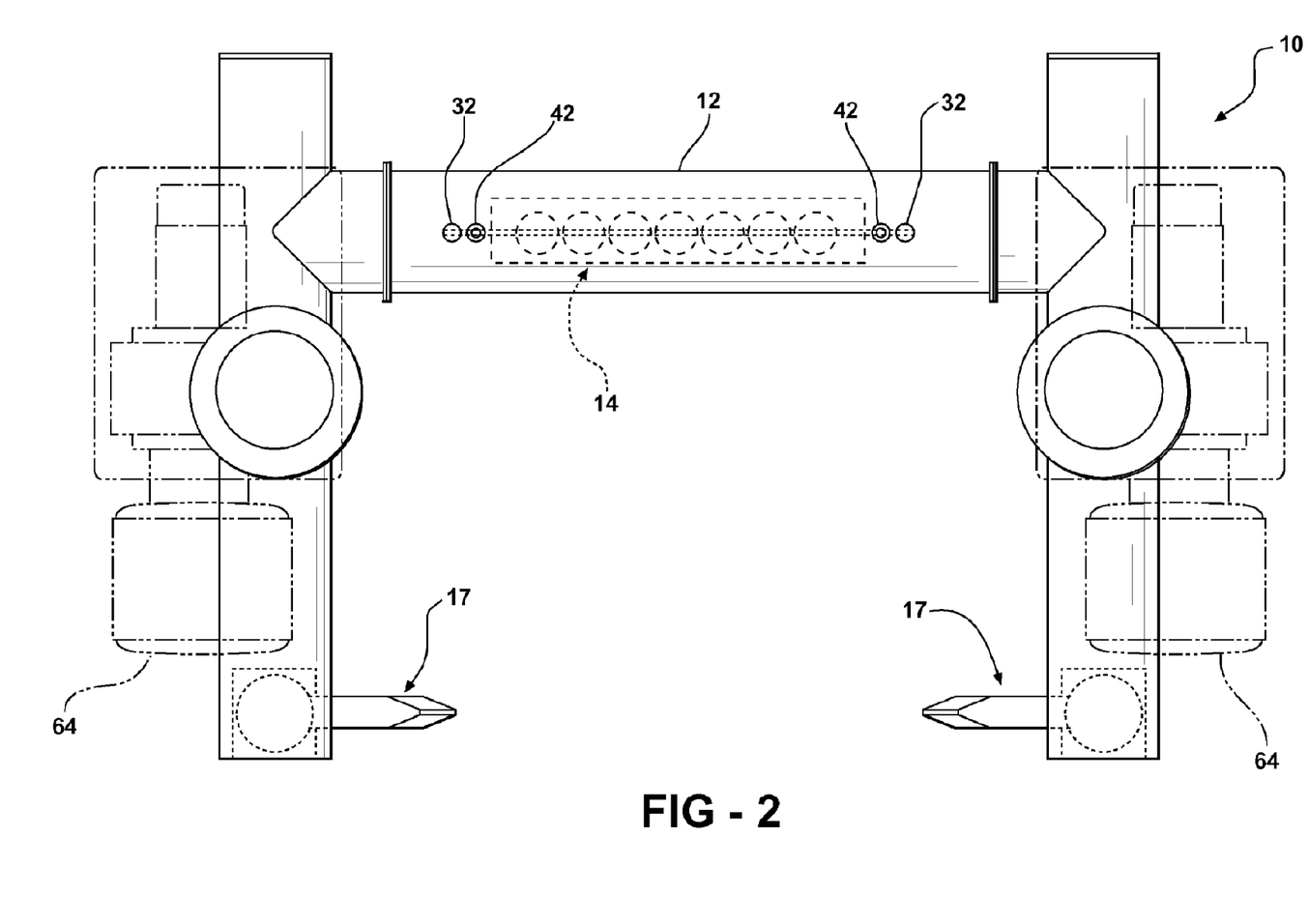
FIG. 2 is a top view of the subject invention.
Figure 3:
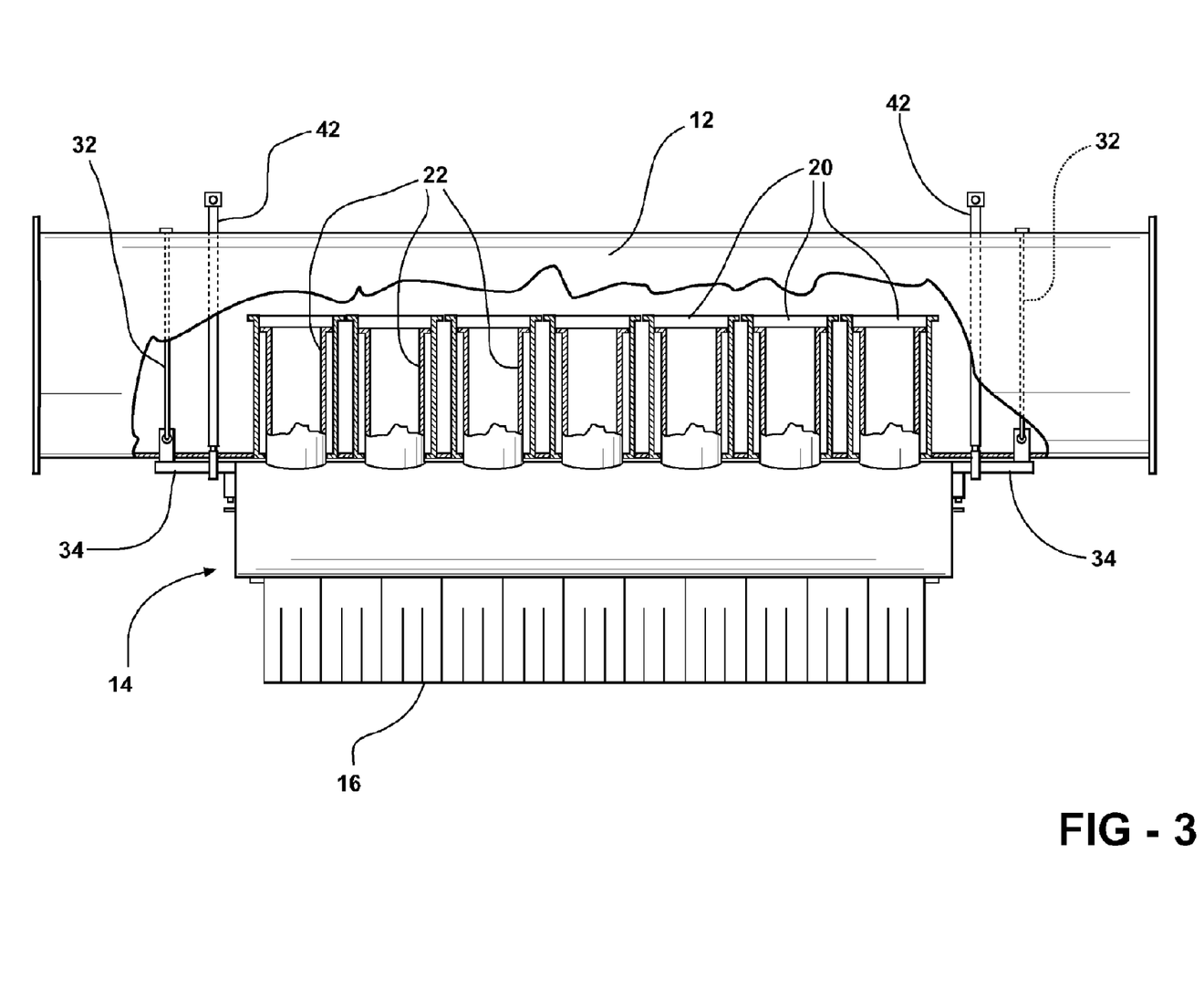
FIG. 3 is a frontal view similar to FIG. 1 but showing only the nozzle of the invention in the retracted position.

An air delivery conduit, including a plurality of pairs of telescoping tubes 20 and 22, interconnects the plenum 12 and the nozzle system 14 for delivering air from the plenum 12 to the nozzle system 14 while allowing the nozzle system 14 to move in an adjustment direction toward and away from the plenum 12 between various vertical operating positions, as illustrated by comparing FIGS. 1 and 3. The telescoping tubes 20 and 22 include a base tube 20 extending from the support plenum 12 and a movable tube 22 in telescoping relationship with the base tube 20 and attached to the nozzle system 14. The tubes 20 and 22 are rigid and self-supporting and may be made of various materials such as metal or plastic. The tubes 20 and 22 are circular in cross section, as shown in phantom in FIG. 2, and have a close or airtight fit. There may be a sliding seal incorporated between the tubes 20 and 22 to effect an air tight seal to prevent the leakage of air as the movable tubes 22 are moved into and out of the fixed or base tubes 20. The base tubes 20 are welded or otherwise fastened to the support plenum 12.

The nozzle system 14 is elongated and includes a fixed outer and upper shell 24 and a movable lower or inner shell 26 movably supported by the fixed shell 24. The movable tubes 22 are attached to the fixed shell 24 by welding or fasteners. The inner or movable shell 26 is rotatably supported within the fixed shell 24 as the fixed shell 24 has an elongated opening along the bottom for the passage of air into the nozzle 16 and the movable shell 26 has an elongated opening along the top to accommodate the rotational movement of the movable shell 26 about a nozzle axis which is at the center of the circular shells 24 and 26.

The nozzle system 14 is suspended by bungee chords 32 which are attached to a cross bar 34, the cross bar 34 supporting the fixed shell 24. The bungee chords 32 extend upwardly to an upper end 38 secured to the plenum 12 and act as a spring 40 to react between that upper end 38 and the cross bar 34 to lift the nozzle system 14 in the event of loss of power, or the like.

An actuator in the form of a pneumatic cylinder 42 is included for moving the nozzle system 14 between the operating positions whereby the nozzle system 14 may be moved up and down to accommodate the changing longitudinal configuration of a vehicle 18. The piston of the pneumatic cylinder 42 is attached to the cross bar 34 to move the nozzle system 14 up and down between raised and lowered operating positions. The bungee chords 32 act as a biasing system for automatically retracting the nozzle system 14 toward the raised operating position in response to loss of control by the actuator 42.

The assembly also includes a rotary drive in the form of a solenoid 46 for rotating the nozzle 16 about the nozzle axis extending transversely to the adjustment direction and the nozzle 16 whereby the nozzle system 14 may be rotated about the nozzle axis to efficiently direct air against the contour of the vehicle 18. The rotary drive 46 includes a solenoid to oscillate the outer or movable shell back and forth about the nozzle axis fifteen degrees in either direction from neutral, i.e., straight down.

Figure 5:
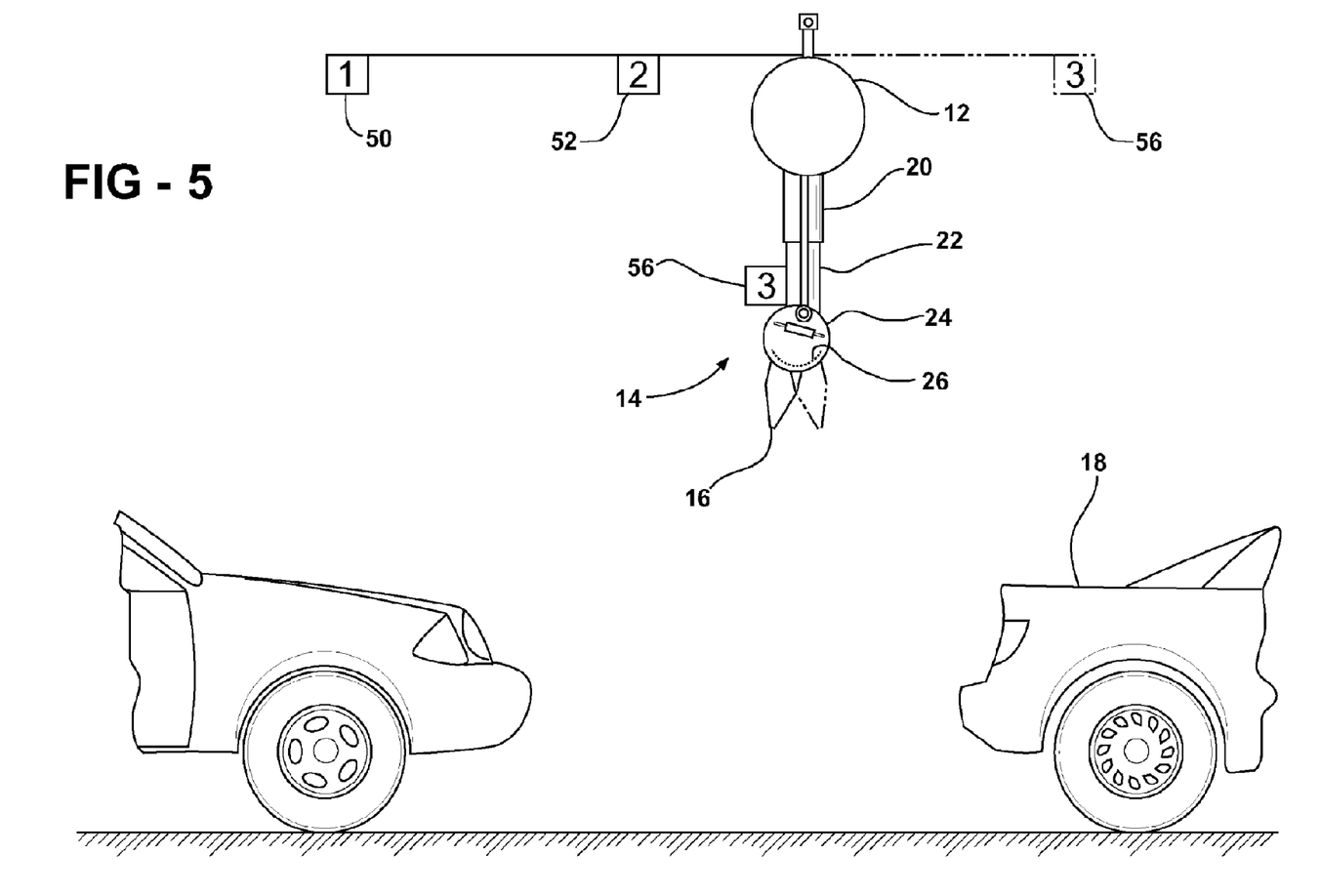
FIG. 5 is a side elevational view showing the nozzle of the invention relative to vehicles and relative to sensors for controlling the operational position of the nozzle.
Figure 6:
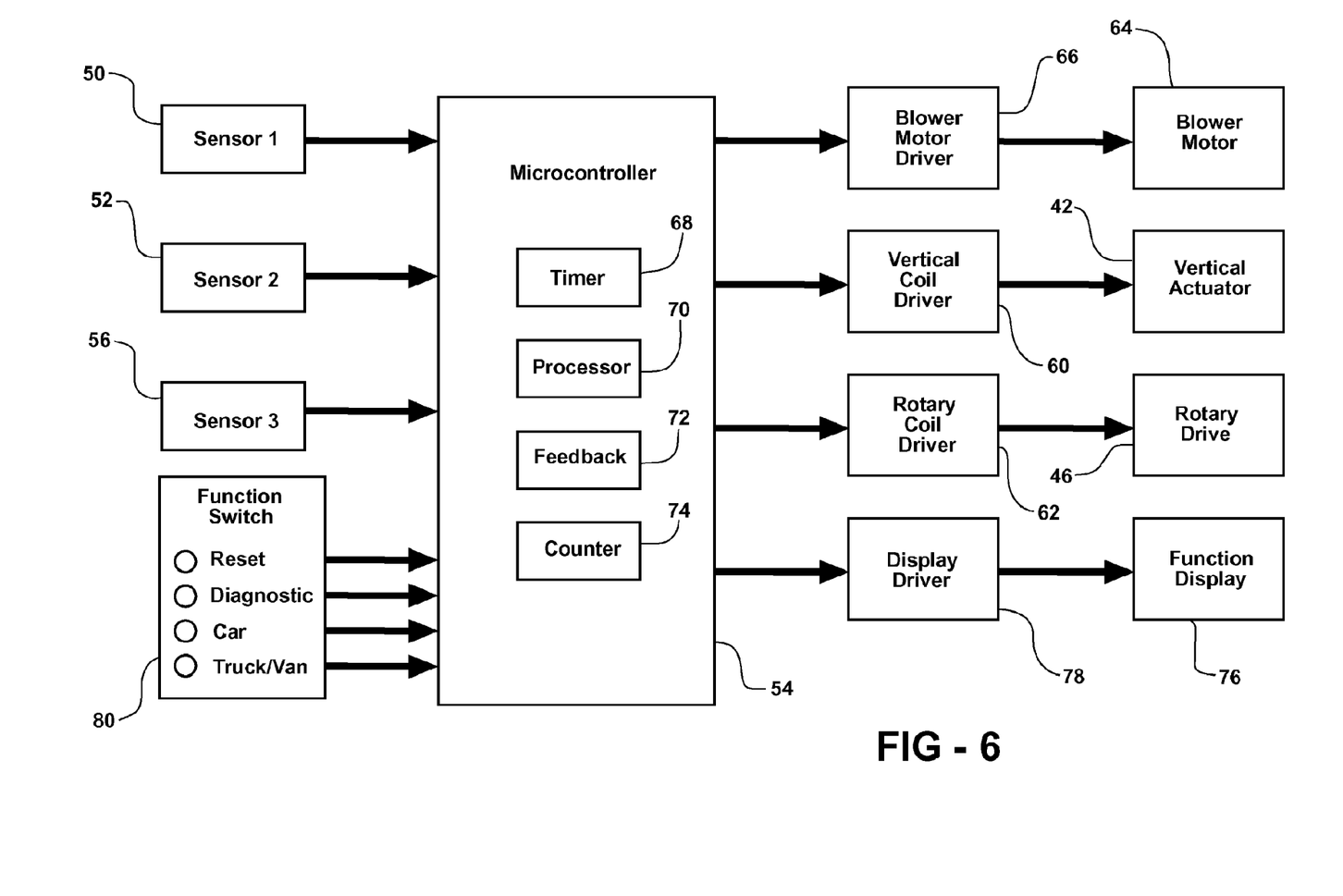
FIG. 6 is block diagram of the control system use to control the movement of the subject invention.

As illustrated in FIG. 5, the assembly 10 is characterized by a first sensor 50 disposed upstream of the nozzle 16 for detecting the presence of a vehicle 18 and a second sensor 52 disposed between the first sensor 50 and the nozzle 16 for detecting the contour of a vehicle 18. As shown in FIG. 6, a controller 54 is included for generating a blower start signal in response to the first sensor 50 and for generating an actuator signal to energize the actuator 42 and move the nozzle system 14 between the raised and lowered operating positions. The nozzle system 14 is raised and lowered between the various operating positions and the nozzle 16 is rotated about the nozzle axis extending transversely to the adjustment direction whereby the nozzle system 14 may be moved up and down to accommodate the changing longitudinal configuration of the vehicle 18 and the nozzle 16 may be rotated about the nozzle axis to efficiently direct air against the contour of the vehicle 18.

A third sensor 56 is disposed adjacent the nozzle 16 to sense the front and rear of a vehicle 18, the controller 54 being responsive to the third sensor 56 for generating a rotary signal to energize the a rotary drive 46 for rotating said nozzle 16 about a nozzle axis.

All of the sensors are ultra-sonic and are disposed above the vehicle for continuously sensing or reading the contour or profile of the vehicle from above. As set forth above, the first sensor 50 detects an entering vehicle and the third sensor 56 detects the absence or exit of a vehicle. The third sensor 56 can be positioned downstream of the nozzle 16 and at the same horizontal level or height as the first 50 and second 52 sensors. In other words, all three sensors 50, 52, 56 are at the same height above the vehicle, as shown in phantom in FIG. 5.

The controller 54 includes a processor 70 for providing a second blower start-up signal in response to said second sensor 52, i.e., a backup signal. In addition, the controller 54 includes a processor 70 for providing a rotary signal in response to the second sensor 52 to energize the rotary drive 46 for rotating the nozzle 16 about a nozzle axis in response to sensing the end of a roof of a vehicle. The second sensor 52 also controls the rotation of the nozzle 16 by the rotary drive 46 toward the front of the vehicle as well as rotation back toward the rear of the vehicle as the rear of the roof passes the second sensor 52.

The processor 70 also processes the actuator signal to energize the actuator 42 and move the nozzle system 14 vertically down in response to the first sensor 50 sensing a vehicle and processes a second actuator signal to energize the actuator 42 and move the nozzle system 14 vertically up in response to the second sensor 52 sensing a high contour vehicle and/or move the nozzle system 14 vertically down in response to the second sensor 52 sensing the rear end of the roof of the vehicle, but only after a predetermined time delay sufficient for the rear end of the vehicle to reach the nozzle system 14. In other words, the second sensor 52 senses the rear of the roof of the vehicle and after a time delay, which depends upon the conveyor speed moving the vehicle, the nozzle 16 is moved vertically downward toward the trunk of the vehicle or the bumper in the case of a van. The third sensor 56 also provides a duplicate actuator signal by sensing the roof, i.e., verifies that a roof is beneath the third sensor and the processor 70 processes the duplicate actuator signal to make sure to energize the actuator 42 and move the nozzle system 14 vertically down in response to the third sensor 56. The most effective drying of the vehicle is attained by moving the nozzle 16 vertically to follow the contour of the vehicle as sensed by the three sensors 50, 52, 56.

The controller 54 includes a timer circuit 58 for timing the operational time for the blower in response to the blower start signal. As the vertical actuator 42 is driven through a vertical coil driver 60 and the rotary drive 46 is driven though a rotary driver 62, the blower motor 64 is driven through a blower motor driver 66. The controller 54 includes a processor 70 for adjusting the operational time of the blower motor 64 in response to the number of vehicles 18 per predetermined time period to optimize the number of blower starts per hour. In other words, instead of starting and stopping the blower motor 64 between vehicles 18 in the event the vehicles 18 are far enough apart, the processor 70 will determine the average frequency of the vehicles and determine how often or at what time periods the blower motor 64 will be turned on and off to optimize the number of motor 64 starts, i.e., minimize the number of motor 64 starts.

Figure 4:
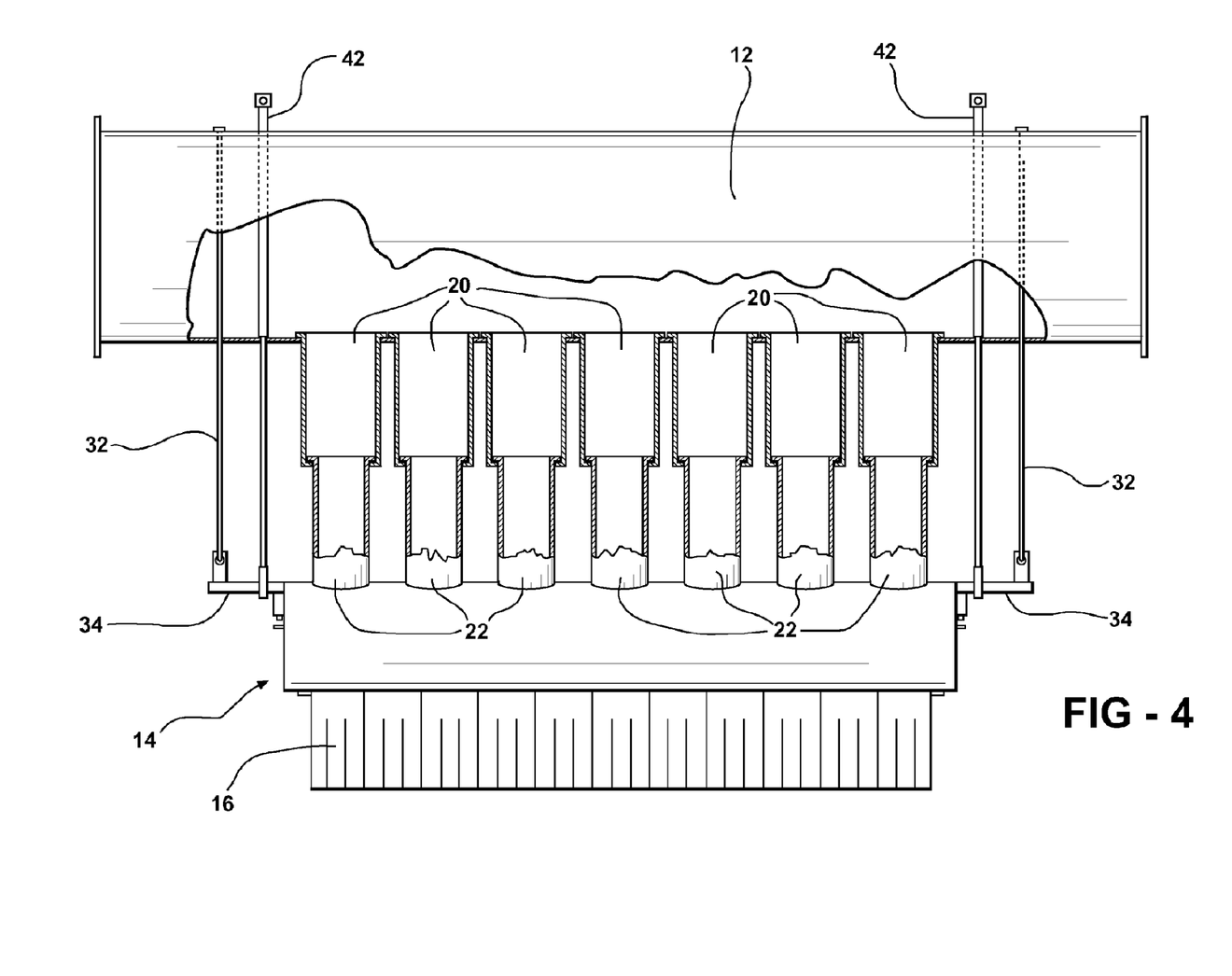
FIG. 4 is a frontal view like FIG. 3 but showing the nozzle of the invention in the extended position.

A feedback circuit 72 is included for signaling the controller 54 in response to the nozzle system 14 reaching the lowered operating position. In the event the nozzle system 14 does not reach the lowered position, an alarm will be triggered. The feedback 72 maybe an electrical circuit or may be implemented into the software that is responsible for the position of the nozzle system 14. Because the third sensor 56 moves with the nozzle system 14, the controller 54 has real time information for the position of the nozzle system 14. Normally, the nozzle system 14 is either in the upper vertical position of FIG. 3 or the lowered vertical position of FIG. 4.

The controller 54 is responsive to the sensors 50, 52, 56 for generating signals to start the blower and move the nozzle system 14 vertically downward in response to the first sensor 50 detecting the presence of a vehicle without the second 52 and third 56 sensors detecting a vehicle. The controller 54 generates signals to move the nozzle system 14 vertically upward in response to the second sensor 52 detecting the presence of a vehicle with a high roof, regardless of what the other sensors are sensing. The controller 54 generates signals to rotate the nozzle system 14 toward the front of the vehicle in response to the second sensor 52 detecting the presence of a vehicle without the second sensor 52 detecting a vehicle roof. The controller 54 generates signals to move the nozzle system 14 vertically downward and to rotate the nozzle system 14 toward the rear of the vehicle in response to the second sensor 52 detecting the rear end of the vehicle roof. The controller 54 generates signals to stop the blower in response to all of the sensors 50, 52, 56 detecting the absence of a vehicle.

The controller 54 also includes a counter 74 for counting the number of vehicles passing under the nozzle system 14. A display monitor 76 is driven through a display driver 78 for displaying information from the controller 54, including the number of vehicles 18. Added to this is a function switch 80 connected to the controller 54 for controlling the controller 54. The function switch 80 may reset the system, run diagnostic functions to check the system, operate the display 76 to display the number and type of vehicles processed, e.g., cars and/or trucks or vans.

Accordingly, the invention provides a method of blowing liquids from a vehicle 18 comprising the steps of moving a vehicle along a vehicle path, positioning a nozzle 16 above the vehicle path, sensing the approach of a vehicle to the nozzle, lowering the nozzle toward the vehicle contour, blowing air through the nozzle, sensing the contour of the vehicle, rotating the nozzle toward the front of the vehicle, moving the nozzle vertically to accommodate the contour of the vehicle, rotating the nozzle in the opposite direction toward the rear of the vehicle, and timing the operational time for blowing air through the nozzle in response to sensing the approach of a vehicle for optimizing the blower on time. The number of vehicles or the rate of the vehicles is counted and the blower operational time is adjusted in response to the number of vehicles per predetermined time period to optimize the number of blower starts per hour.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. An assembly for blowing liquids from a vehicle comprising;

a support plenum (12) for distributing air, a nozzle system (14) including a nozzle (16) for directing air toward the top of a vehicle, an air delivery conduit interconnecting said plenum (12) and said nozzle system (14) for delivering air from said plenum (12) to said nozzle system (14) while allowing said nozzle system (14) to move in an adjustment direction toward and away from said plenum (12) between raised and lowered vertical operating positions, an actuator (42) for moving said nozzle system (14) between said operating positions whereby said nozzle system (14) may be moved up and down to accommodate the changing longitudinal configuration of a vehicle (18), a rotary drive (46) for rotating said nozzle (16) about a nozzle axis extending transversely to said adjustment direction and said nozzle (16) whereby said nozzle system (14) may be rotated about said nozzle axis to efficiently direct air against the contour of the vehicle (18), a first sensor (50) disposed upstream of said nozzle (16) for detecting the presence of a vehicle from above and for generating a blower start signal (50) and for generating an actuator signal to energize said actuator (42) and move said nozzle system (14) vertically between said operating positions, a second sensor (52) disposed between said first sensor (50) and said nozzle (16) for detecting the contour of a vehicle from above, a third sensor (56) for sensing the rear of a vehicle from above, and a controller (54) responsive to said sensors for processing a rotary signal to energize said rotary drive (46) for rotating said nozzle (16) about a nozzle axis toward the front of the vehicle and toward the rear of the vehicle and for processing said blower start signal and said actuator signal.

2. An assembly as set forth in claim 1 wherein said controller (54) includes a timer circuit (68) for timing the operational time for the blower in response to said blower start signal.

3. An assembly as set forth in claim 1 wherein said controller (54) includes a processor (70) for adjusting the blower operational time in response to the number of vehicles per predetermined time period to optimize the number of blower starts per hour.

4. An assembly as set forth in claim 1 wherein said controller (54) includes a processor (70) for providing a second blower start-up signal in response to said second sensor (52).

5. An assembly as set forth in claim 1 wherein said controller (54) includes a processor (70) for providing a rotary signal to energize said rotary drive (46) for rotating said nozzle (16) about a nozzle axis.

6. An assembly as set forth in claim 1 wherein said controller (54) includes a processor (70) for providing a rotary signal to energize said rotary drive (46) for rotating said nozzle (16) about a nozzle axis in response to sensing the end of a roof of a vehicle.

7. An assembly as set forth in claim 1 wherein said controller (54) includes a processor (70) for processing said actuator signal to energize said actuator (42) and move said nozzle system (14) vertically down in response to said first sensor (50).

8. An assembly as set forth in claim 1 wherein said controller (54) includes a processor (70) for processing a second actuator signal to energize said actuator (42) and move said nozzle system (14) vertically up in response to said second sensor (52) sensing a high contour vehicle.

9. An assembly as set forth in claim 1 wherein said controller (54) includes a processor (70) for processing a second actuator signal to energize said actuator (42) and move said nozzle system (14) vertically down in response to said second sensor (52) sensing the rear end of the roof of the vehicle after a predetermined time delay sufficient for the rear end of the vehicle to reach said nozzle system (14).

10. An assembly as set forth in claim 7 wherein said controller (54) includes a processor (70) for processing a duplicate actuator signal to energize said actuator (42) and to make sure to move said nozzle system (14) vertically down in response to said third sensor (56) sensing a vehicle roof.

11. An assembly as set forth in claim 1 including a feedback circuit (72) for signaling said controller (54) in response to said nozzle system (14) reaching said lowered operating position.

12. An assembly as set forth in claim 1 including a biasing system (40) for automatically retracting said nozzle system (14) toward said raised operating position in response to loss of control by said actuator (42).

13. An assembly as set forth in claim 1 wherein said controller (54) includes a counter (74) for counting the number of vehicles passing under said nozzle system (14).

14. An assembly as set forth in claim 1 including a display monitor (76) for displaying information from said controller (54).

15. An assembly as set forth in claim 1 including a function switch (80) connected to said controller (54) for controlling said controller (54).

16. An assembly as set forth in claim 1 wherein said first (50) and second (52) and third (56) sensors are horizontally aligned so as to be disposed at the same height above the vehicle.

17. An assembly for blowing liquids from a vehicle comprising:
  a support plenum (12) for distributing air;
  a nozzle system (14) including a nozzle (16) for directing air toward the top of a vehicle;
  an air delivery conduit interconnecting said plenum (12) and said nozzle system (14) for delivering air from said plenum (12) to said nozzle system (14) while allowing said nozzle system (14) to move in an adjustment direction toward and away from said plenum (12) between raised and lowered vertical operating positions;
  an actuator (42) for moving said nozzle system (14) between said operating positions whereby said nozzle system (14) may be moved up and down to accommodate the changing longitudinal configuration of a vehicle (18);
  a rotary drive (46) for rotating said nozzle (16) about a nozzle axis extending transversely to said adjustment direction and said nozzle (16) whereby said nozzle system (14) may be rotated about said nozzle axis to efficiently direct air against the contour of the vehicle (18);
  a first sensor (50) disposed upstream of said nozzle (16) for detecting the presence of a vehicle from above and for generating a blower start signal (50) and for generating an actuator signal to energize said actuator (42);
  a second sensor (52) disposed between said first sensor (50) and said nozzle (16) for detecting the contour of a vehicle from above;
  a third sensor (56) for sensing the rear of a vehicle from above;
  said first (50) and second (52) and third (56) sensors being horizontally aligned so as to be disposed at the same height above the vehicle; and
  a controller (54) responsive to said sensors (50, 52, 56) for generating signals to start said blower and move said nozzle system (14) vertically downward in response to said first sensor (50) detecting the presence of a vehicle without said second (52) and third (56) sensors detecting a vehicle, and for generating signals to move said nozzle system (14) vertically upward in response to said second sensor (52) detecting the presence of a vehicle with a high roof, and for generating signals to rotate said nozzle system (14) toward the front of the vehicle in response to said second sensor (52) detecting the presence of a vehicle without said second sensor (52) detecting a vehicle roof, and for generating signals to move said nozzle system (14) vertically downward and to rotate said nozzle system (14) toward the rear of the vehicle roof, and for generating signals to stop said blower in response to all of said sensors (50, 52, 56) detecting the absence of a vehicle.

* * * * *